United States Patent
Lee et al.

(10) Patent No.: US 10,408,927 B2
(45) Date of Patent: Sep. 10, 2019

(54) METHOD FOR AN EQUIVALENT CIRCUIT PARAMETER ESTIMATION OF A TRANSDUCER AND A SONAR SYSTEM USING THEREOF

(71) Applicants: Jeong Min Lee, Gyeongsangnam-Do (KR); Byung Hwa Lee, Gyeongsangbuk-Do (KR)

(72) Inventors: Jeong Min Lee, Gyeongsangnam-Do (KR); Byung Hwa Lee, Gyeongsangbuk-Do (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 441 days.

(21) Appl. No.: 15/265,375

(22) Filed: Sep. 14, 2016

(65) Prior Publication Data
US 2017/0003383 A1    Jan. 5, 2017

Related U.S. Application Data

(62) Division of application No. 13/626,041, filed on Sep. 25, 2012, now abandoned.

(51) Int. Cl.
*G01S 7/00* (2006.01)
*G01S 7/52* (2006.01)
*G01S 7/524* (2006.01)

(52) U.S. Cl.
CPC .......... *G01S 7/52004* (2013.01); *G01S 7/524* (2013.01)

(58) Field of Classification Search
USPC ......................................................... 367/13
See application file for complete search history.

(56) References Cited

U.S. PATENT DOCUMENTS

| | | | |
|---|---|---|---|
| 4,452,084 A | 6/1984 | Taenzer | |
| 4,779,020 A | 10/1988 | Konno et al. | |
| 5,309,410 A | 5/1994 | Kittower | |
| 5,438,998 A | 8/1995 | Hanafy | |
| 5,638,822 A | 6/1997 | Seyed-Bolorforosh et al. | |
| 5,962,790 A | 10/1999 | Lynnworth et al. | |
| 5,987,992 A | 11/1999 | Watanabe et al. | |
| 6,050,361 A | 4/2000 | Ruffa et al. | |
| 6,109,109 A | 8/2000 | Brown | |
| 6,234,021 B1 | 5/2001 | Piety et al. | |
| 6,343,511 B1 | 2/2002 | Lynnworth et al. | |
| 6,645,150 B2 | 11/2003 | Angelsen et al. | |

(Continued)

*Primary Examiner* — James R Hulka
(74) *Attorney, Agent, or Firm* — Ostrolenk Faber LLP (57) ABSTRACT

The present disclosure relates to an active sonar system including a transmitter; a transducer; and an impedance matching circuit, and a method of estimating an equivalent model parameter of a multi-mode transducer, wherein an electrical equivalent model parameter having a plurality of stages corresponding to each mode is estimated by estimating an individual mode impedance and a total mode impedance from multi-mode impedance data and obtaining an interference amount of adjacent modes, and an equivalent model modeled thereby for which an interference effect by a multi-mode is taken into consideration is used for the design of an impedance matching circuit to minimize actual model fabrication and effectively derive detailed design elements and the like, thereby allowing an integrated circuit design with peripheral electronic units for interfacing the sonar system.

7 Claims, 10 Drawing Sheets

(56) References Cited

U.S. PATENT DOCUMENTS

| | | |
|---|---|---|
| 7,391,872 B2 | 6/2008 | Pompei |
| 7,551,518 B1 | 6/2009 | Tenghamn |
| 7,905,323 B2 | 3/2011 | Larsen |
| 9,103,905 B2 * | 8/2015 | Lee .................. G01S 7/524 |
| 2001/0007591 A1 | 7/2001 | Pompei |
| 2002/0156379 A1 | 10/2002 | Angelsen et al. |
| 2007/0140518 A1 | 6/2007 | Larsen |
| 2008/0285777 A1 | 11/2008 | Pompei |
| 2011/0317515 A1 | 12/2011 | Tenghamn |
| 2012/0157853 A1 | 6/2012 | Gelly et al. |
| 2014/0086013 A1 * | 3/2014 | Lee .................. G01S 7/524 |
| | | 367/87 |
| 2014/0160892 A1 * | 6/2014 | Lee .................. G01S 7/524 |
| | | 367/87 |

* cited by examiner

METHOD FOR AN EQUIVALENT CIRCUIT PARAMETER ESTIMATION OF A TRANSDUCER AND A SONAR SYSTEM USING THEREOF

CROSS REFERENCE TO RELATED APPLICATION

This application is a divisional of U.S. application Ser. No. 13/626,041, to filed Sep. 25, 2012 by Jeong Min LEE, et. al., entitled A METHOD FOR AN EQUIVALENT CIRCUIT PARAMETER ESTIMATION OF A TRANSDUCER AND A SONAR SYSTEM USING THEREOF, the contents of which are incorporated by this reference.

BACKGROUND OF THE INVENTION

Field of the invention

The present disclosure relates to a method of estimating an equivalent model parameter of a transducer and a sonar system using the same, and more particularly, to a method of estimating an equivalent model parameter of a transducer in which a case where a mutual impedance interference effect between adjacent resonant modes of a multi-mode transducer is large and the interference contributions thereof are different is taken into consideration, and a sonar system using the same.

Description of the Related Art

An active sonar system is a system for transmitting underwater acoustic waves and detecting signals reflected from a target, and the detection performance may be dependent upon how large acoustic output power is transmitted in a desired direction. Accordingly, the characteristic of an electrical impedance of the transducer which is a load should be first correctly specified for the purpose of the design of a high output power transmitter constituting an active sonar. Furthermore, an impedance matching circuit corresponding to an interfacing circuit between transmitter-transducer is very important to effectively transmit the maximum power from the transmitter to the load. If the impedance characteristic of a transducer is expressed as an electrical equivalent model, then it may be possible to obtain integrated model for a transmitter-matching circuit-transducer which is a primary constituent element of the active sonar, thereby allowing an effective design and analysis.

Equivalent modeling for a transducer in the related art has been primarily limited to a narrow-band single-mode transducer with no interference of adjacent resonant modes but equivalent modeling for a multi-mode transducer in which there exist several resonant modes within a broadband has been difficult to obtain correct estimation with an analytical method due to a mutual effect of adjacent resonant modes. As an equivalent modeling method for the multi-mode transducer, there have been proposed a method of deriving an approximate equation from the slope of measured admittance and resonant frequency information for each resonant mode and obtaining an equivalent model parameter from it, and the like, but it has a disadvantage that an interference effect between adjacent resonant modes is not taken into consideration and thus the estimation error is very large. In order to overcome the foregoing problem, an optimization method has been applied thereto, but in case of a resonant mode having a relatively small impedance contribution among adjacent resonant modes, it has a problem that the estimation of a resonant mode is impossible or there occurs a failure for the resonant frequency of the estimated mode. Furthermore, it has a problem that a complex calculation is required to derive an initial value during the process of estimating an equivalent model parameter from impedance data, and the estimation result is largely dependent upon the initial value.

SUMMARY OF THE INVENTION

A task to be solved by the present disclosure is to solve the foregoing problem, and there is provided a new method of equivalent model parameter for which an interference effect for each resonant mode is taken into consideration for a multi-mode transducer in which there exist an interference effect between adjacent resonant modes.

Another task to be solved by the present disclosure is to solve the foregoing problem, and there is provided a sonar system including a transducer modeled as the above equivalent model, in a transmitting unit of an active sonar system including a transmitter, an impedance matching circuit, and a transducer.

The objective of the present disclosure may be accomplished by providing a method of estimating an equivalent model parameter of a multi-mode transducer, wherein an electrical equivalent model parameter having a plurality of stages corresponding to each mode is estimated by estimating an individual mode impedance and a total mode impedance from multi-mode impedance data and considering an interference amount of adjacent modes.

The equivalent model parameter estimation method may include a resonant frequency derivation process of dividing a frequency section for divisions between resonant modes and obtaining a resonant frequency corresponding to each mode; an individual mode impedance estimation process of removing an interference effect of adjacent modes within the divided mode section to obtain an impedance for each mode (S300); and a multi-mode impedance estimation process of considering even a multi-mode impedance characteristic in which individual modes are combined to have an effect on one another.

The equivalent model parameter estimation method may further include an interference amount derivation process of quantitatively deriving an interference effect between adjacent modes; and a resonant frequency failure correction process of correcting a failure of the resonant frequency from the interference amount.

The resonant frequency derivation process may divide a frequency section for each mode by a minimum point of the conductance from impedance data, and derive a maximum point as a resonant frequency of the relevant mode.

The individual mode impedance estimation process may include an individual mode impedance computation process of removing an interference component combined with a k-th resonant mode from a measured total admittance and computing a k-th individual mode impedance; and a fitness function display process of displaying an error average between the computed k-th individual mode impedance and a k-th resonant mode impedance to be estimated as a fitness function ($B_k$) to be minimized in the relevant mode section.

The multi-mode impedance estimation process may estimate a total impedance for which impedance estimation values of individual modes for a multi-mode equivalent model are combined, and display it as another fitness function (A) to minimize an error from the measured impedance.

The resonant frequency failure correction process may correct a resonant frequency in the direction of its differential values being the same when a differential value of a total measured conductance is different from a sum of differential values for interfered adjacent mode conductances at the computed resonant frequency.

A resultant fitness function (F) may be expressed as:

$$F = C_1 A + C_2 \sum_{k=1}^{N} B_k$$

by applying weight constants ($C_1$, $C_2$).

Furthermore, the objective of the present disclosure may be accomplished by an active sonar system, including a transmitter modeled as an input power source and an input impedance; a transducer configured to convert an electrical signal of the transmitter into an acoustic wave or convert an acoustic wave of the outside into an electrical signal; and an impedance matching circuit configured to transmit the electric power of the transmitter to the transducer between the transmitter and transducer, wherein the transducer is modeled as an electrical equivalent model parameter having a plurality of stages corresponding to each mode by estimating an individual mode impedance and a total mode impedance from multi-mode impedance data and considering an interference amount of adjacent modes.

The transducer may be modeled to estimate a multi-mode impedance by dividing a frequency section for divisions between resonant modes and obtaining a resonant frequency corresponding to each mode, and removing an interference effect of adjacent modes within the divided mode section to obtain an impedance for each mode, and considering even a multi-mode impedance characteristic in which individual modes are combined to have an effect on one another in an integrated manner.

The transducer may be modeled by quantifying an interference effect between adjacent modes and correcting a failure of the resonant frequency.

The transducer may be modeled by dividing a frequency section for each mode by a minimum point of the conductance from impedance data, and deriving a maximum point as a resonant frequency of the relevant mode.

The transducer is modeled by removing an interference component combined with a k-th resonant mode from a measured total admittance and computing a k-th individual mode impedance, and displaying an error average between the computed k-th individual mode impedance and a k-th resonant mode impedance to be estimated as a fitness function ($B_k$) to be minimized in the relevant mode section The transducer may be modeled by estimating a total impedance for which impedance estimation values of individual modes for a multi-mode equivalent model are combined, and displaying it as another fitness function (A) to minimize an error from the measured impedance.

The transducer may be modeled by correcting a resonant frequency in the direction of its differential values being the same when a differential value of a total measured conductance is different from a sum of differential values for interfered adjacent mode conductances.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a method of estimating an equivalent model parameter of a transducer according to an embodiment of the present disclosure and a sonar system using the same will be described in detail.

Figure 1A:
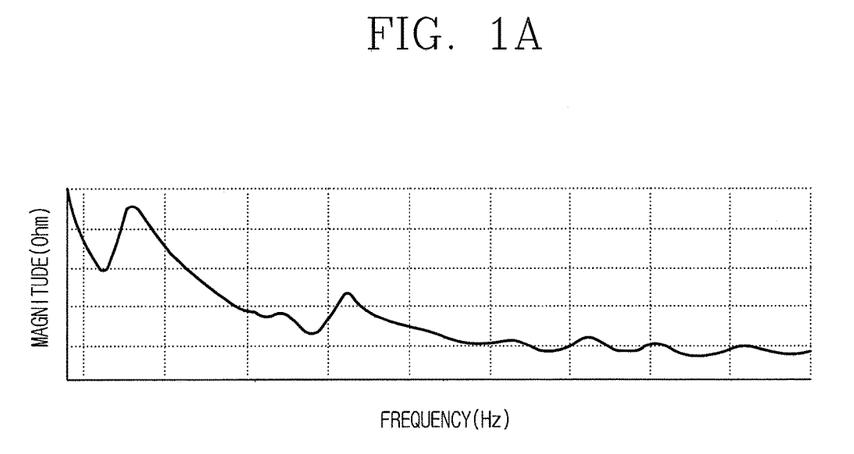
FIG. 1A and FIG. 1B are a view illustrating an impedance characteristic according to the frequency of the acoustic and ultrasonic wave bands in a multi-mode transducer according to the present disclosure.
Figure 1B:
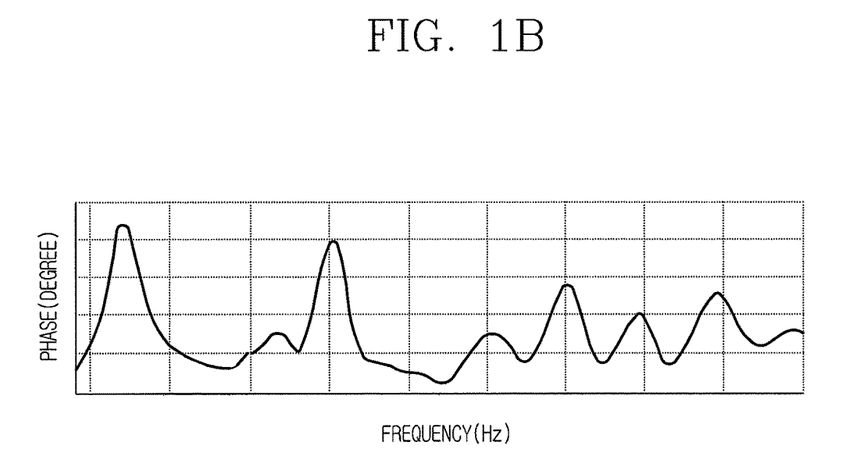

FIG. 1A and FIG. 1B are a view illustrating an impedance characteristic according to the frequency of the acoustic and ultrasonic wave bands in a multi-mode transducer 220 according to the present disclosure. FIG. 1A illustrates a magnitude value of the impedance according to the frequency, and FIG. 1B illustrates a phase value of the impedance according to the frequency. It is seen that resonance occurs at a frequency adjacent to the phase peak value, and the number of resonances corresponds to the number of modes.

Figure 2A:
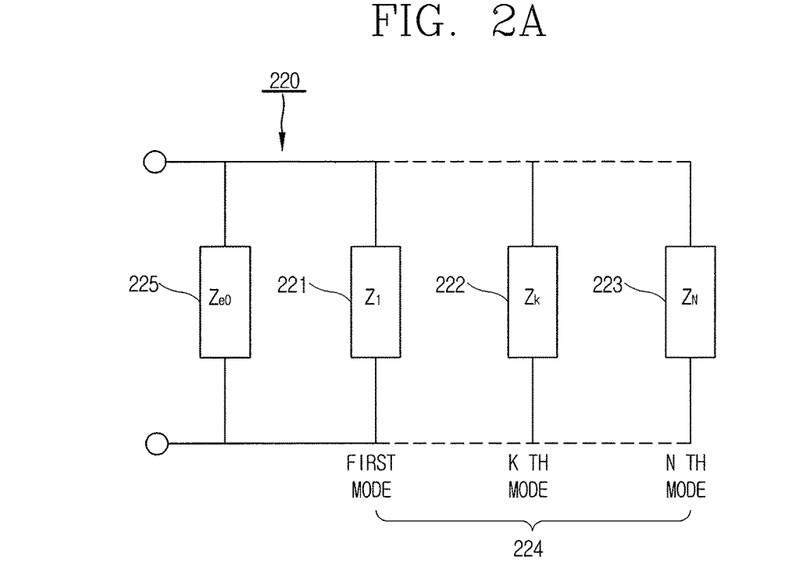
FIG. 2A and FIG. 2B are a circuit diagram illustrating an impedance characteristic of the multi-mode transducer according to the present disclosure as an electrical equivalent model using an electrical lumped element.
Figure 2B:
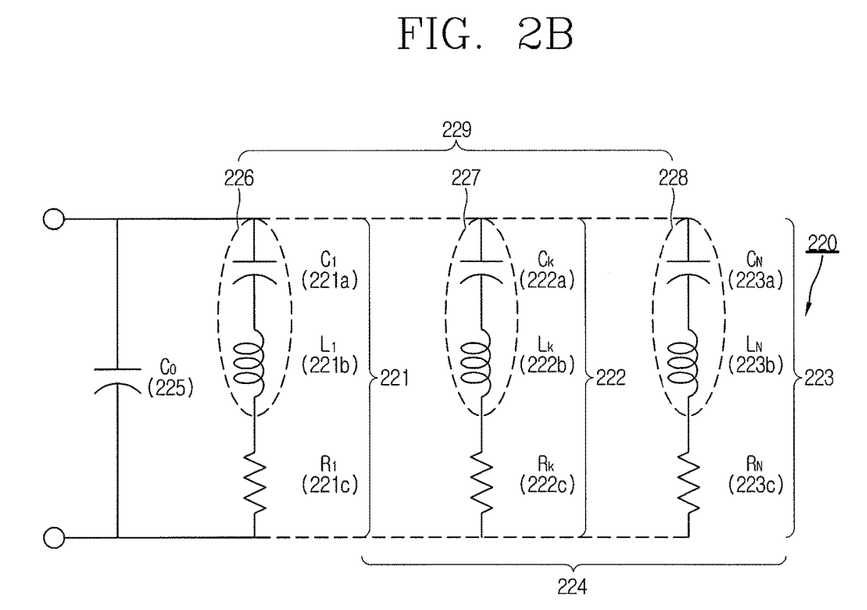

FIG. 2A and FIG. 2B are a circuit diagram illustrating an impedance characteristic of the multi-mode transducer 220 according to the present disclosure as an electrical equivalent model using electrical lumped elements. In other words, a transducer made of an electrical-mechanical-acoustic structure is formulated into an electrical equivalent model as illustrated in FIG. 2A and FIG. 2B using the impedance data of the multi-mode transducer in which there exist several resonant modes in FIG. 1A and FIG. 1B, and the equivalent model may be used in an integrated design together with the transmitter and impedance matching circuit of the active sonar system. The electrical characteristic impedance 225 in FIG. 2A is a portion indicating an electrical characteristic of the transducer, and a first through a third resonant circuit 221-223 illustrate mechanical-acoustic characteristics, and the individual resonant circuits are regarded as portions expressing one resonant mode, respectively. Furthermore, FIG. 2B is an example of an actually configured circuit using R-L-C lumped elements, and the electrical characteristic impedance 225 may be expressed as an electrical capacitance, and the first through the third resonant circuit 221-223 as R-L-C series resonant circuits.

Figure 3:
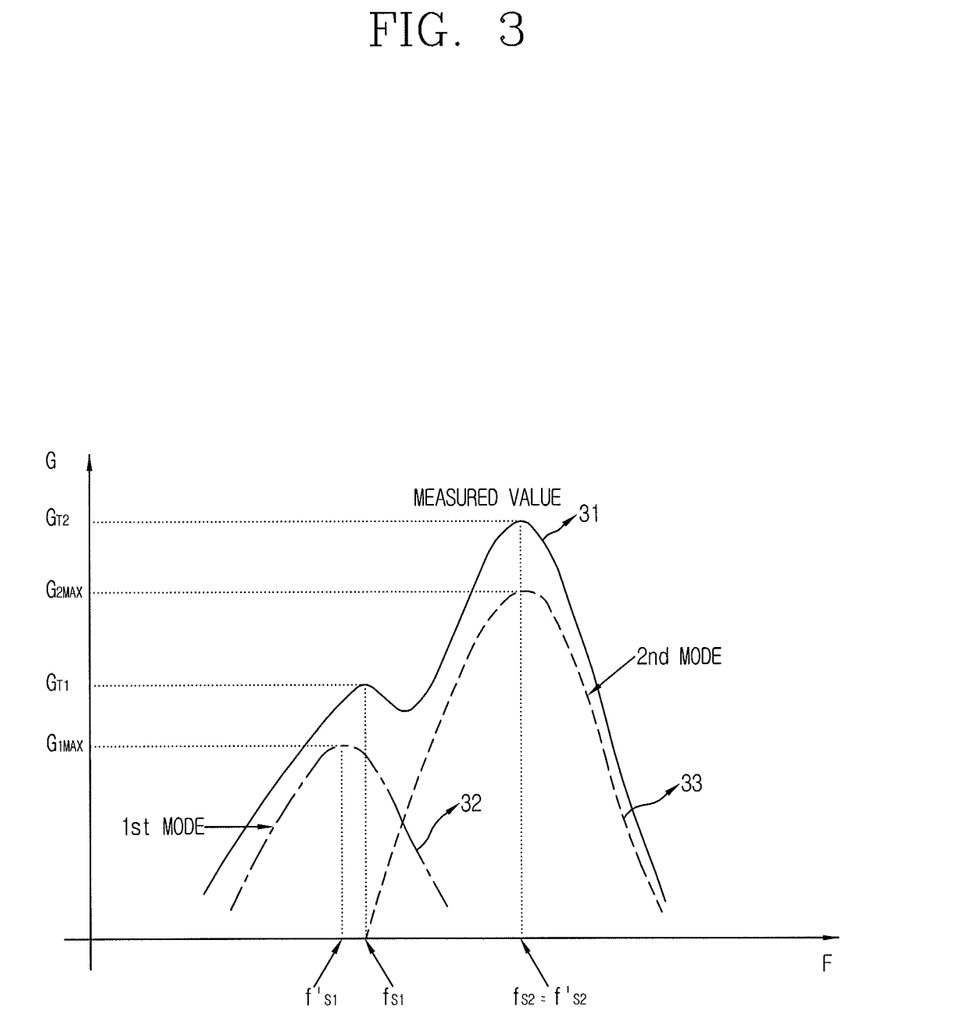
FIG. 3 is an exemplary view illustrating a measured conductance and an estimated conductance for each mode when there exist mutual interference by adjacent modes.

FIG. 3 is an exemplary view illustrating a measured conductance and an estimated conductance for each mode when there exist mutual interference by adjacent modes.

However, the multi-mode impedance characteristic in FIG. 1A and FIG. 1B may include a mutual interference effect of adjacent resonant modes without being configured with a simple sum of individual resonant modes. For example, taking two resonant modes in which there exist an interference effect between adjacent modes into consideration, the characteristic of a measured total resonant mode conductance (the real part of admittance corresponding to a reciprocal number of the impedance 31) is different from that of pure individual mode conductances (first mode conductance 32, second mode conductance 33) and thus it is seen that they are different from each other in the aspect of the resonant frequency and magnitude of conductance.

Though the first mode conductance 32 by only an estimated individual mode has a maximum value $G_{1max}$ at a resonant frequency $f'_{s1}$ and the second mode conductance 33 has a maximum value $G_{2max}$ at a resonant frequency $f'_{s2}$, the total resonant mode conductance 31 by a measured total resonant mode has maximum values $G_{T1}$ and $G_{T2}$, respectively, at resonant frequencies $f_{s1}$ and $f_{s2}$. It is caused by interference by a mutual effect between the first and second modes which are resonant modes.

Referring to FIG. 3, the resonant frequency $f'_{s1}$ of the first mode conductance 32 and the resonant frequency $f_{s1}$ of the measured total resonant mode conductance 31 have different values because a value of the second mode conductance 33 is not an ignorable small value compared to the maximum value $G_{1max}$ of the first mode conductance 32 at the resonant frequency $f'_{s1}$' of the first mode conductance 32. Similarly, for the second mode conductance 33, the resonant frequency $f'_{s2}$ of the second mode conductance 33 and the resonant frequency $f_{s2}$ of the measured total resonant mode conductance 31 may have different values.

The following multi-mode transducer equivalent modeling method considers an adjacent interference effect between resonant modes, and thus it may be possible to minimize an error between the measured total impedance characteristic and the estimated impedance characteristic by an individual mode parameter, and an equivalent model parameter estimation scheme of the multi-mode transducer 220 is as follows.

Figure 4:
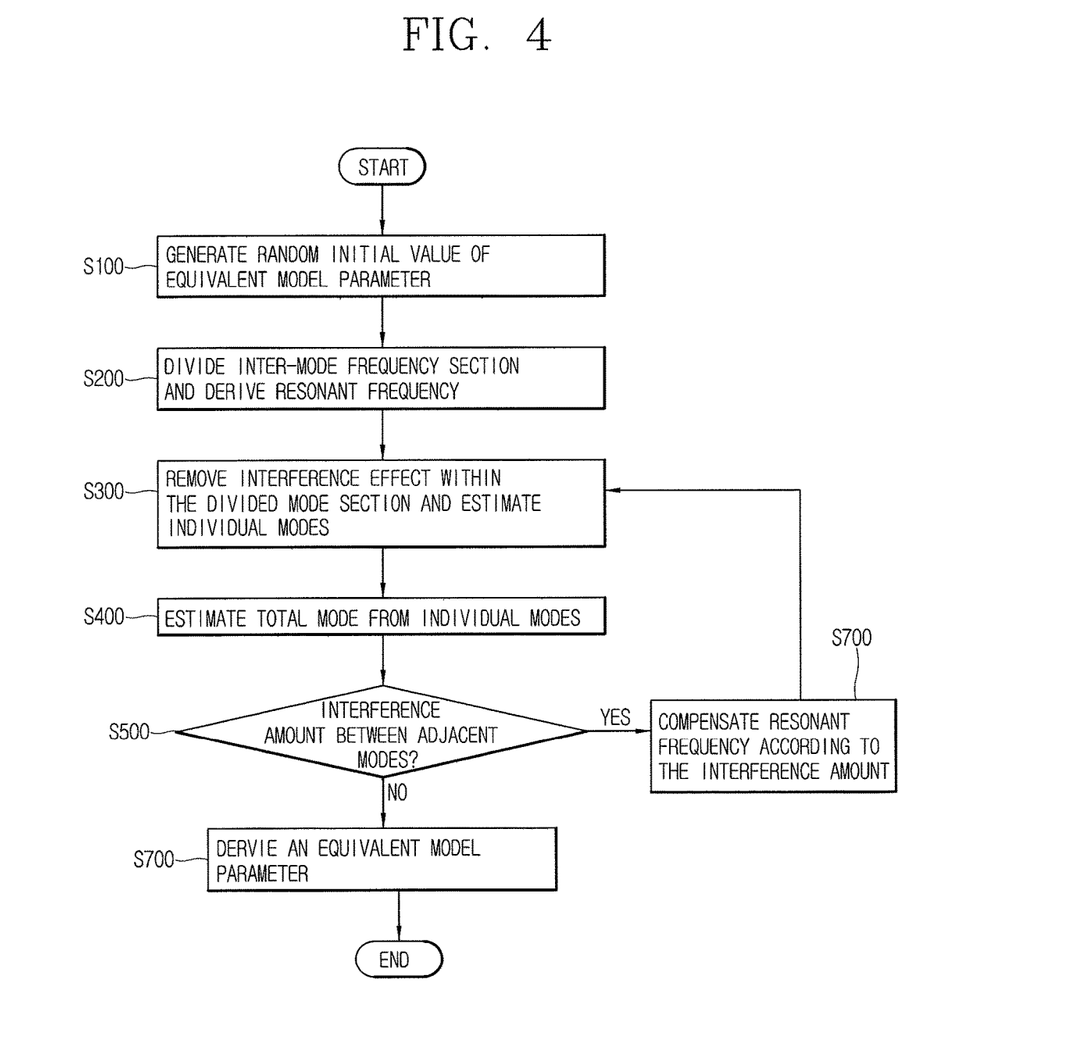
FIG. 4 is a flow chart illustrating the process of performing a broadband equivalent model parameter estimation method of the multi-mode transducer 220 in which there exists an interference effect between adjacent modes within a broadband contrived by the present disclosure.

In this aspect, FIG. 4 is a flow chart illustrating the process of performing a broadband equivalent model parameter estimation method of the multi-mode transducer 220 in which there exists an interference effect between adjacent modes within a broadband contrived by the present disclosure.

The equivalent model parameter estimation method may be carried out by an initial value generation process (S100), a resonant frequency derivation process (S200), an individual mode impedance estimation process (S300), a total mode impedance estimation process (S400), an inter-mode interference amount determination process (S500), a resonant frequency correction process (S600), and an equivalent model parameter derivation process (S700).

As illustrated in the drawing, an initial value is randomly generated (S100) by acquiring the measured impedance information of the object transducer and applying a probability optimization algorithm using a solution set which is not one solution without a computation process for deriving an initial value of the equivalent model parameter. A frequency section is divided for divisions between resonant modes, and a resonant frequency corresponding to each mode is derived (S200). An interference effect of adjacent modes within the divided mode section is removed and an equivalent model parameter expressing an independent impedance characteristic for the relevant individual mode is estimated (S300). It is estimated (S400) by considering even a multi-mode impedance characteristic combined with independent individual modes to have an effect on one another in an integrated manner. An interference amount between adjacent modes is quantitatively determined (S500) to correct a resonant frequency of the relevant mode (S600), and when the interference amount is large, the resonant frequency of the relevant mode is corrected (S600), and as a result, an equivalent circuit parameter of the multi-mode transducer is derived (S700).

For an optimization method for deriving an equivalent circuit parameter for the multi-mode transducer, there are algorithms such as a gene, a least square method, and the like, but an operation for deriving an initial value should be carried out in advance for most of the algorithms in the optimization process. During this process, parameter initial values are derived through a complex calculation from characteristic information on an impedance or property value of the transducer, and in most cases, the derived initial values are closely related to the accuracy of a finally estimated parameter. Accordingly, in order to solve the problem, according to the present disclosure, initial values of the equivalent model parameter are randomly generated (S100) by applying a probability optimization algorithm using a solution set which is not one solution to use them in the optimization process.

Figure 5A:
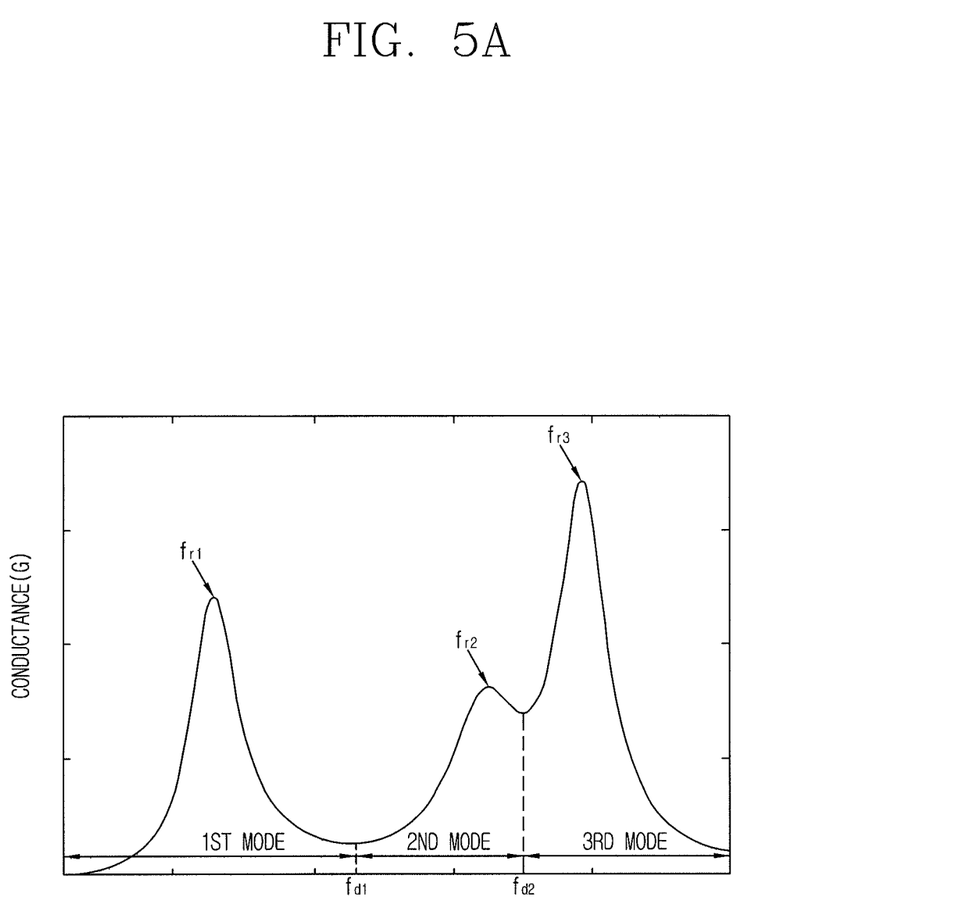
FIG. 5A and FIG. 5B are a view illustrating a conductance of the transducer having three resonant modes according to the present disclosure, a frequency section for each mode divided through differentiating the frequency of the conductance, and a resonant frequency of the relevant mode.

For divisions between resonant modes and resonant frequency derivation from the measured transducer impedance data, a maximum point and a minimum point of the conductance corresponding to the real part of the transducer admittance are obtained as illustrated in FIG. 5A. The maximum point of conductance is derived by resonant frequencies (fr1, fr2, fr3) of the relevant mode, and the minimum point of the conductance is determined by references (fd1, fd2, fd3) for dividing the frequency section for each mode. For an example of the method of deriving a maximum point and a minimum point of the transducer conductance, there is a method of obtaining the extreme point from differentiation for a frequency of the conductance component illustrated in FIG. 5A similarly to FIG. 5B. Accordingly, divisions between modes and derivation of a resonant frequency (S200) can be implemented even for a multi-mode with a different mutual interference amount between resonant modes.

As illustrated in FIG. 3, a total impedance characteristic 31 measured within the relevant divided resonant mode section includes an effect 33 caused by adjacent resonant modes as well as an effect 32 by the relevant mode, and thus if it can be shown only with a single mode characteristic by removing the mutually interfered effect, then an equivalent model for the multi-mode transducer in which there exists an interference effect of adjacent modes may be expressed as a sum of individual mode characteristics. By taking this point into consideration, the impedance characteristic of each resonant mode is calculated from theoretical parameter values derived from the estimation process, and the calculated impedance effect of adjacent modes is subtracted from the relevant resonant mode to be estimated, thereby sequentially estimating impedance characteristics for individual modes.

Figure 6A:
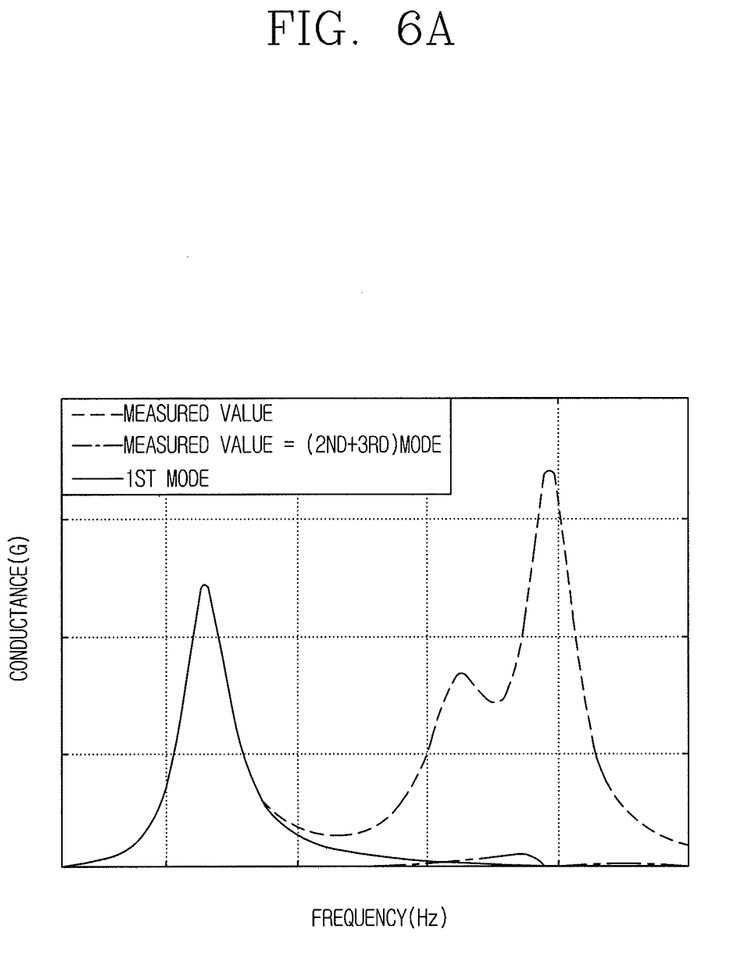
FIG. 6A, FIG. 6B and FIG. 6C are a comparison chart in which an estimated value and a measured value of the conductance component for each resonant mode are compared with each other on an impedance characteristic from which the interference effect of adjacent resonant modes is removed.
Figure 6B:
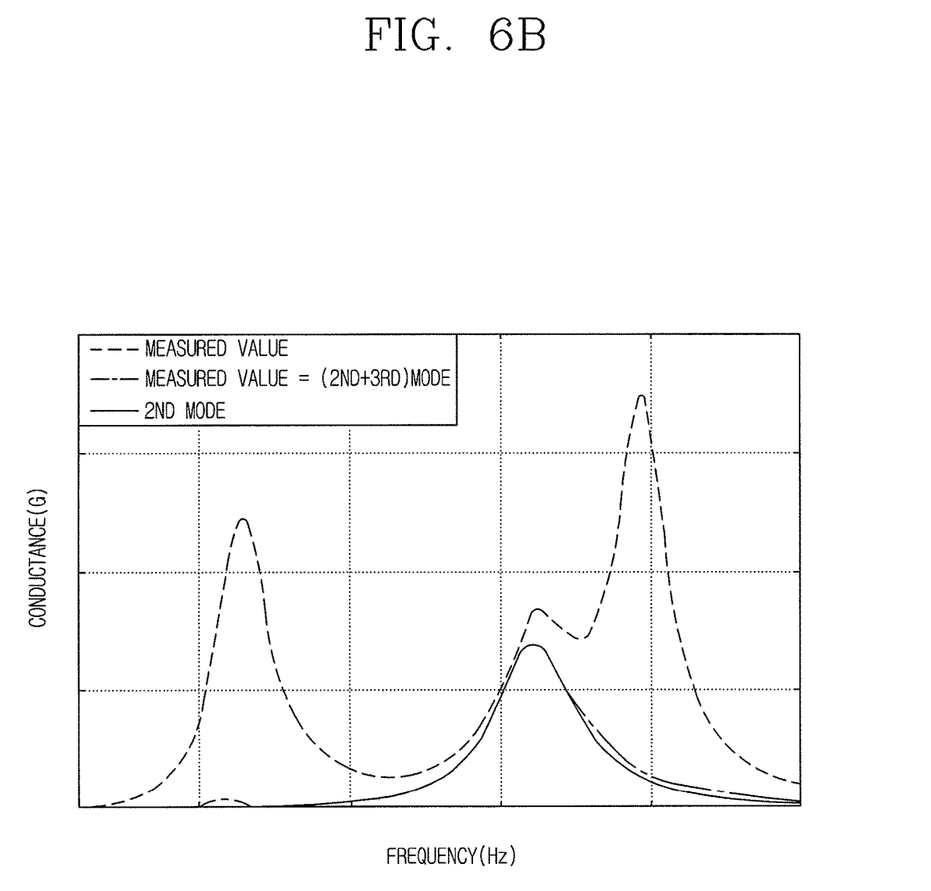
Figure 6C:
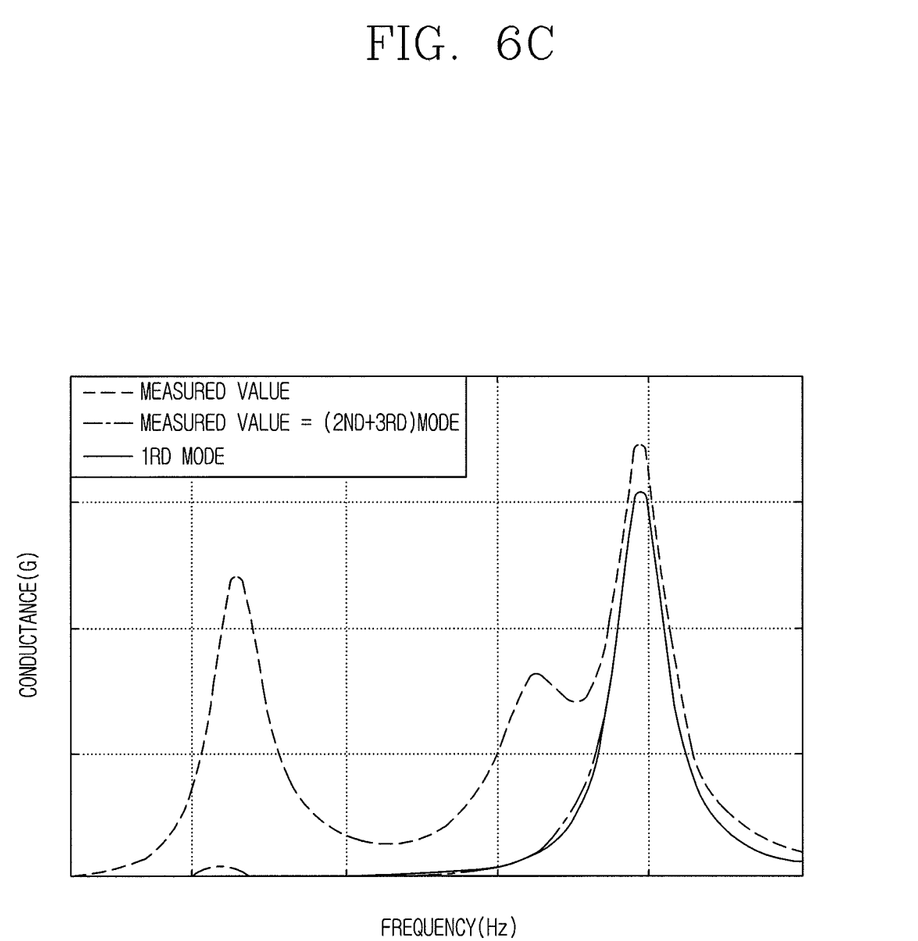

FIG. 6A, FIG. 6B and FIG. 6C are a comparison chart in which an estimated value and a measured value of the conductance component for each mode are compared with each other on an impedance characteristic from which the interference effect between adjacent modes is removed. In case where there exist three resonant modes as illustrated in FIG. 5A, a value in case where an adjacent resonant mode effect is removed from a total measured value, an estimated value of the conductance component for each mode, and a measured value of the conductance component by a total resonant mode are shown with reference to FIGS. 6A through 6C.

Referring to FIGS. 6A through 6C, the measured value (conductance in FIG. 5A) of a total conductance by the first through the third mode is commonly shown (single dotted line), and individual conductances (values for which an effect of adjacent resonant modes is removed from a total measured value; dotted line) and estimated values (solid lines) for the first mode, the second mode, and the third mode, respectively, are shown.

In FIG. 6A, it is seen that the individual conductance (dotted line) corresponds to a value for which an estimated value of the second mode and the third mode is subtracted from a measured value of the total conductance, and a resonant frequency of the estimated value (solid line) by only the first mode is substantially identical to a resonant frequency of the measured value. It is because an interference effect caused by the second mode and the third mode is small since the first mode is separated compared to the second and the third mode. On the contrary, in FIGS. 6B and 6C, it is seen that a resonant frequency of the estimated value (solid line) only by the second and the third mode, respectively, has an error compared to a resonant frequency of the measured value, and it is because the second and the third mode are close to each other and thus there is interference between them. Accordingly, an impedance estimation method by taking an interference effect between adjacent modes into consideration is required.

As a method for obtaining an estimated value only for individual modes from which an interference effect between adjacent modes is removed, an error average for an arbitrary k-th resonant mode impedance of the multi-mode transducer is as shown in the following equation 1.

$$B_k = \frac{1}{xk} \sum_{m=1}^{xk} \left[ \frac{1}{Y_{real}(\omega_m) - \left\{ Y_0(\omega_m) + \sum_{i=1, i \ne k}^{N} Y_i(\omega_m) \right\}} - Z_k(\omega_m) \right]$$ [Equation 1]

Here, Δk is the number of measured impedance data within the k-th resonant mode section, and $Z_k$ is an estimated theoretical impedance of the equivalent model for the k-th resonant mode.

The first term of the denominator is a measure total admittance component, and the second and third terms are a sum of admittance components other than the k-th resonant mode.

Accordingly, the computation of a whole fraction purely produces only the k-th individual mode impedance characteristic excluding an interference component combined with the k-th resonant mode from the measured admittance. A fitness function ($B_k$) is shown as Equation 1 to minimize an error average between a result of the computed k-th individual mode impedance and a k-th resonant mode impedance ($Z_k(\omega m)$) to be theoretically estimated in the relevant mode section.

However, when an equivalent model parameter of the multi-mode transducer is estimated only using this method, an inclination to estimate only a single mode characteristic excluding a mutual interference effect of adjacent resonant modes is strong, and thus when individual modes are combined with one another, it has a high probability that an estimated error occurs in the aspect of a total mode. Accordingly, an additional portion of fitness function to be estimated (S400) by taking a portion having a mutual effect on the total resonant mode into consideration in an integrated manner is required. In other words, a theoretical total impedance for a multi-mode equivalent model is obtained using parameter information for each resonant mode that are estimated for individual modes, and another fitness function (A) is configured to minimize an error from the measured impedance. A resultant fitness function for an equivalent modeling of the multi-mode transducer in which there exists an interference effect between adjacent modes is configured using two fitness functions at the same time by taking both an estimation method for the individual modes and a total multi-mode estimation method combined therewith into consideration. The resultant fitness function (F) is determined as shown in the following equation 2 by applying weight constants ($C_1$, $C_2$) to the multi-mode fitness function, and the resultant fitness function (F) is minimized to minimize each estimated error for the individual mode and total mode, respectively.

$$F = C_1 A + C_2 \sum_{k=1}^{N} B_k$$ [Equation 2]

On the other hand, as illustrated in the first resonant mode in FIG. 3, a resonant frequency by a parameter computed during the equivalent model estimation process may be different from a resonant frequency derived from the measured total impedance due to an interference effect of adjacent modes, and thus it should be corrected. As a result, it is required to quantitatively derive an interference effect between adjacent modes (S500) to determine whether to correct the resonant frequency. To this end, a total conductance characteristic including the interference effect and independent conductance characteristics for individual modes are compared at a resonant frequency of the relevant mode, and the difference thereof is defined as an interference amount.

Figure 5B:
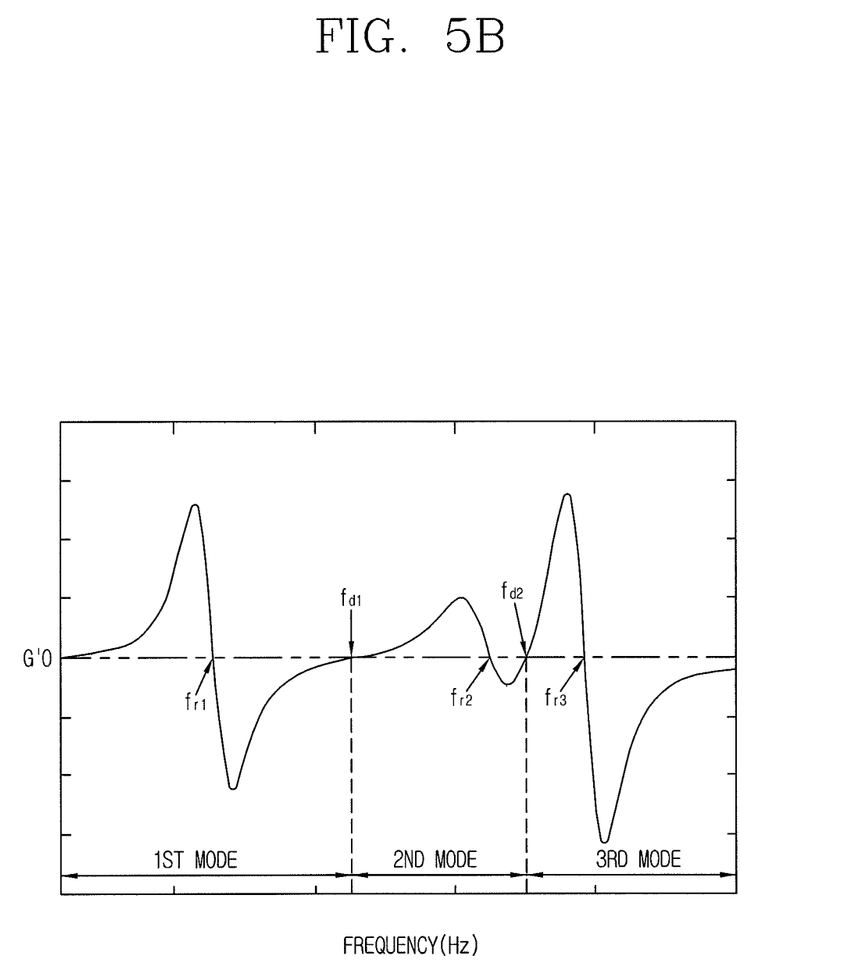

When there is a mutual interference effect between resonant modes, correction for the resonant frequency is required during the equivalent model estimation process. An error or non-error of the resonant frequency is determined through a comparison of differential values for the measured and estimated conductances by using the foregoing interference amount determination (S500), and applying a differentiation method for conductance data as illustrated in FIG. 5B.

Accordingly, when there exists a mutual interference by adjacent modes, the measured conductance and the estimated conductance for each mode are differentiated to determine whether the resonant frequencies are identical to each other, and when a failure of the resonant frequency is confirmed, it is required to have the process of compensating this.

A differential value is always zero at a resonant frequency of the relevant estimated individual mode, and thus a differential value of the measured total conductance at this frequency should be identical to a sum of differential values for interfered adjacent mode conductances excluding the relevant individual mode.

However, a case of the two values being different is a case that an error is included in the estimated resonant frequency, and thus the resonant frequency is corrected in the direction of the two differential values being the same (S600).

An equivalent circuit parameter of the multi-mode transducer is finally derived (S700) while the interference effect removal and individual mode estimation process (S300) is repeated again within the divided mode section by reflecting the corrected resonant frequency.

Figure 7:
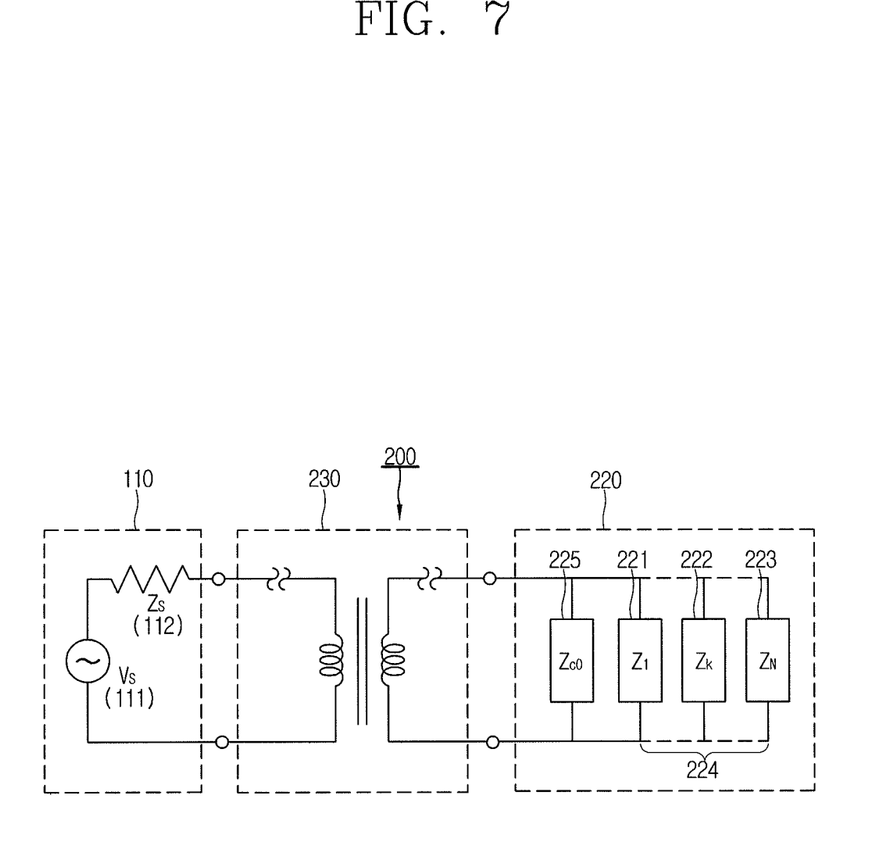
FIG. 7 is a circuit diagram illustrating a transmitting unit of the active sonar system modeled as a transmitter, an impedance matching circuit, and a transducer according to the present disclosure.

FIG. 7 is a circuit diagram illustrating a transmitting unit 200 of the active sonar system modeled as a transmitter 110, an impedance matching circuit 230, and a transducer 220 according to the present disclosure. When the transducer is equalized to an equivalent model using the equivalent model parameter estimation method, the transmitting unit 200 of the active sonar system may include the transmitter 110, the impedance matching circuit 230, and the transducer 220, and the impedance matching circuit can be designed according to a desired condition from them.

The transmitter 110 is modeled as an input power source 111 supplying power and an input impedance 112 corresponding to an internal resistor of the input power source.

The impedance matching circuit 230 is a circuit located between the transmitter 110 and the transducer 220 to transmit electric power from the transmitter 110 to the transducer 220 at high efficiency.

The transducer 220 is a device configured to convert an electrical signal of the transmitter into an acoustic wave or convert an acoustic wave of the outside into an electrical signal, which is modeled as an electrical equivalent model parameter having a plurality of stages corresponding to each mode by estimating an individual mode impedance and a total mode impedance from multi-mode impedance data and considering an interference amount of adjacent modes.

The transducer 220 is modeled to estimate a multi-mode impedance by generating an initial value in a random manner without a computation process for deriving an initial value of the equivalent model parameter, dividing a frequency section for divisions between resonant modes, obtaining a resonant frequency corresponding to each mode, removing an interference effect of adjacent modes within the divided mode section to estimate an impedance for each individual mode, and considering even a multi-mode impedance characteristic combined with independent individual modes to have an effect on one another in an integrated manner.

More specifically, the transducer divides a frequency section for each mode by a minimum point of the conductance from the impedance data of the transducer 220, and derives a maximum point of the conductance as a resonant frequency of the relevant mode.

More specifically, the transducer 220 is modeled by removing an interference component combined with a k-th resonant mode from a measured total admittance and computing a k-th individual mode impedance, and displaying an error average between the computed k-th individual mode impedance and a k-th resonant mode impedance to be estimated as a fitness function ($B_k$) to be minimized in the relevant mode section.

More specifically the transducer 220 is modeled by estimating a total impedance for which impedance estimation values of individual modes for a multi-mode equivalent model are combined, and displaying it as another fitness function (A) to minimize an error from the measured impedance.

Furthermore, the transducer 220 is modeled by quantifying an interference effect between adjacent modes and correcting a failure of the resonant frequency when the interference amount is larger than a predetermined reference value.

More specifically, the transducer 220 is modeled by correcting a resonant frequency in the direction of its differential values being the same when a differential value of a total measured conductance is different from a sum of differential values for interfered adjacent mode conductances excluding the relevant individual modes at a resonant frequency of the relevant individual mode.

As described above, according to the present disclosure, it may be possible to estimate an equivalent model parameter that can be correctly modeled by considering even an interference effect between resonant modes in the acoustic and ultrasonic wave bands in a multi-mode transducer.

According to the present disclosure, a multi-mode transducer operated as a load of the sonar system transmitter may be correctly estimated in the acoustic and ultrasonic wave bands, and thus the estimated multi-mode equivalent model may be used for the design of an impedance matching circuit to minimize unnecessary actual model fabrication and effectively derive detailed design elements and the like, thereby allowing an integrated circuit design with peripheral electronic units for interfacing the sonar system.

What is claimed is:
1. A method of estimating an impedance of a transducer included in an active sonar system comprising the transducer and an impedance matching circuit, the method being performed by a processor implemented in an integrated circuit in peripheral electronic units for interfacing to the active sonar system, the processor being deployed for designing the impedance matching circuit, the method including:
dividing a frequency section for divisions between resonant modes of the active sonar system and obtaining a resonant frequency corresponding to each of resonant modes, including a first mode, a second mode, and a third mode in a frequency domain, resonance for each of the resonant modes occurring at a resonant frequency adjacent to a phase peak value for each of the resonant modes, and a first to third resonances occurring at a first to third resonant frequency corresponding respectively to the first to third mode,
removing an interference effect of adjacent modes within the divided frequency section, wherein the interference effect is caused when the second resonant frequency in the second mode and in the third frequency in the third mode are close to each other as to cause interference, to obtain an individual mode impedance for an individual mode;
estimating a total impedance for which impedance estimation values of the individual modes for a multi-mode equivalent model are combined, and minimizing an error from a measured impedance of the transducer to obtain a multimode impedance; and
determining an impedance value for a plurality of resonant parts of the matching circuit based on the multimode impedance,
wherein the designed impedance matching circuit comprises,
a transformer having a primary terminal and a secondary terminal;

a first resonant part comprising an inductor and a capacitor connected in series to each other, wherein the first resonant part is configured to match with the multi-mode impedance based on mechanical-acoustic characteristics of the transducer; and a second resonant part comprising an inductor of the secondary terminal; a capacitor of the transducer, the capacitor being connected to the inductor of the secondary terminal in parallel, and wherein the inductor and the capacitor of the first resonant part has a inductance and capacitance which is determined based on the individual mode impedance and the multi-mode impedance from multi-mode impedance data and an interference amount of adjacent modes.

2. The method of claim 1, wherein an electrical equivalent model of the transducer having a multi-resonant mode has a plurality of stages corresponding to each resonant mode, the plurality of stages comprise the plurality of resonant circuits and an additional component (capacitor) connected in parallel with the plurality of resonant circuits, a resonant circuit comprising a capacitor, an inductor and a resistor connected in series with each other and the plurality of resonant circuits connected in parallel with each other, wherein the electrical equivalent model parameter is derived by estimating an individual mode impedance and a total mode impedance from multi-mode impedance data of a transducer, and by eliminating an interference amount of adjacent modes from individual mode impedances, wherein the interference amount is derived by comparing a total conductance value including the interference effect and independent conductance value for individual modes without the interference effect, and wherein the impedance matching circuit is an electrical circuit comprising electrical lumped elements containing a transformer.

3. The method of claim 2, wherein correcting the failure of the resonant frequency correction corrects a resonant frequency in the direction of its differential values being the same when a differential value of a total measured conductance is different from a sum of differential values for interfered adjacent mode conductance at the computed resonant frequency.

4. The method of claim 1, wherein dividing the frequency section comprises dividing a frequency section for each mode by a minimum point of the conductance from impedance data, and deriving a maximum point as a resonant frequency of the relevant mode.

5. The method of claim 1, wherein obtaining the multi-mode impedance comprises estimating a total impedance for which impedance estimation values of the individual modes for a multi-mode equivalent model are combined, and generating it as another fitness function (A) that minimizes an error from the measured impedance.

6. The method of claim 1, wherein obtaining the individual mode comprises:

removing an interference component combined with a k-th resonant mode from a measured total admittance and computing a k-th individual mode impedance; and displaying an error average between the computed k-th individual mode impedance and a k-th resonant mode impedance to be estimated as a fitness function (Bk) to be minimized in the relevant mode section.

7. The method of claim 6, wherein a resultant fitness function (F) is expressed as:

$$F = C_1 A + C_2 \sum_{k=1}^{N} B_k$$

by applying weight constants (C1, C2) to take an item for minimizing the individual mode estimation error and an item for minimizing an total mode estimation error into consideration at the same time.

* * * * *